United States Patent [19]

Fukui et al.

[11] Patent Number: 4,920,941
[45] Date of Patent: May 1, 1990

[54] FUEL INJECTION CONTROL APPARATUS

[75] Inventors: Toyoaki Fukui; Shogo Omori, both of Kyoto; Masanobu Uchinami, Himeji, all of Japan

[73] Assignee: Mitsubishi Denki Kabushiki Kaisha, Tokyo, Japan

[21] Appl. No.: 382,040

[22] Filed: Jul. 18, 1989

Related U.S. Application Data

[63] Continuation of Ser. No. 189,802, May 3, 1988, abandoned.

[30] Foreign Application Priority Data

May 7, 1987 [JP]  Japan ................................ 62-112826

[51] Int. Cl.$^5$ ............................................. F02D 41/34
[52] U.S. Cl. ..................................... 123/492; 123/493
[58] Field of Search ................ 123/492, 478, 480, 493

[56] References Cited

U.S. PATENT DOCUMENTS 4,454,847  6/1984  Isomura et al. ...................... 123/492

FOREIGN PATENT DOCUMENTS 57-95197   6/1982  Japan .
57-170089 10/1982  Japan .
60-249651 12/1985  Japan .

Primary Examiner—Andrew M. Dolinar
Attorney, Agent, or Firm—Oblon, Spivak, McClelland, Maier & Neustadt

[57] ABSTRACT

A fuel injection control apparatus comprises a load detecting means to detect a load to an engine to thereby generate a signal, a basic injection quantity operating means to operate the signal so as to obtain the pulse width of a basic fuel-injection time for a fuel injector in response to the condition of load, and a limiting means which conducts a dulling treatment to the basic fuel injection pulse width so that limitation of the fuel injection pulse width of the fuel injector in response to a value modified by the dulling treatment is determined on the basis of a limit value correction coefficient in accordance with the condition of load.

3 Claims, 6 Drawing Sheets

FUEL INJECTION CONTROL APPARATUS

This application is a Continuation of application Ser. No. 07/189,802, filed on May 3, 1988, now abandoned.

BACKGROUND OF THE INVENTION

1. Field Of The Invention

The present invention relates to a fuel injection control apparatus to control a fuel injection quantity to the engine by electronic control.

2. Discussion Of Background

When an automobile is accelerated or decelerated, there is found difference in an amount of air to be supplied to the engine between an actual value and a measured value. Specifically, when the automobile is accelerated, an amount of intake air A detected by an air flow sensor (hereinbelow, referred to as an AFS) is far greater than an amount of intake air actually supplied to the engine, whereby an air-fuel ratio becomes rich. On the other hand, the automobile is decelerated, there takes place the opposite phenomenon, whereby the air-fuel ratio becomes lean.

There is a proposal in, for instance, Japanese Unexamined Patent Publication No. 25531/1983 to remove the influence of a bad driving condition caused by the excessively rich air-fuel ratio at the time of acceleration of the automobile or the excessively lean air-fuel ratio at the time of the deceleration.

According to the proposal in the publication, a dulling treatment is applied to a pulse width in a basic fuel injection operation so that the limitation of the pulse width for fuel injection is determined in accordance with a value modified by the dulling treatment of the pulse width. In determination of the upper limit and the lower limit of the pulse width, a limit value correction coefficient $C_1$ at the time of acceleration of 1 or higher and a limit value correction coefficient $C_2$ at the time of deceleration of 1 or lower are used. When the value of dulling treatment is taken as T, the upper limit value is $C_1 \times T$ and the lower limit value is $C_2 \times T$.

In the conventional fuel injection control apparatus having the above-mentioned construction, since the limit value correction coefficient $C_1$ for a limit value $T_1'$ ($T_1' = C_1 \times T$) and the limit value correction coefficient $C_2$ for a limit value $T_2'$ ($T_2' = C_2 \times T$) are respectively made constant, it is difficult to properly adjust the air-fuel ratio at he time of acceleration or deceleration so as to meet various types of automobile and various driving conditions. For instance, assuming that the limit value correction coefficient $C_1$ is previously determined to properly adjust an air-fuel ratio. When the automobile is suddenly accelerated in a low load or at a low revolution speed, there causes some delay in response of performance at the sudden acceleration; this requiring much fuel, and accordingly, the value of coefficient $C_1$ should be increased so as to increase the limit value $C_1 \times T$. On the contrally, under a slow acceleration condition, the response becomes quick enough. Accordingly, it is preferable that the coefficient $C_1$ takes a value near 1. However, when the air-fuel ratio is controlled by using the coefficient $C_1$ at the time of the sudden acceleration, it becomes rich to thereby cause an adverse effect.

SUMMARY OF THE INVENTION

It is an object of the present invention to provide a fuel injection control apparatus capable of following any condition of acceleration or deceleration and of obtaining quickly the optimum air-fuel ratio.

The foregoing and the other objects of the present invention have been attained by providing a fuel injection control apparatus which comprises:

- a load detecting means to detect a load to an engine to thereby generate a signal,
- a basic injection quantity operating means to operate said signal so as to obtain the pulse width of a basic fuel-injection time for a fuel injector in response to the condition of load, and
- a limitting means which conducts a dulling treatment to said basic fuel injection pulse width so that limitation of the fuel injection pulse width of said fuel injector in response to a value modified by the dulling treatment is determined on the basis of a limit value correction coefficient in accordance with said condition of load.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
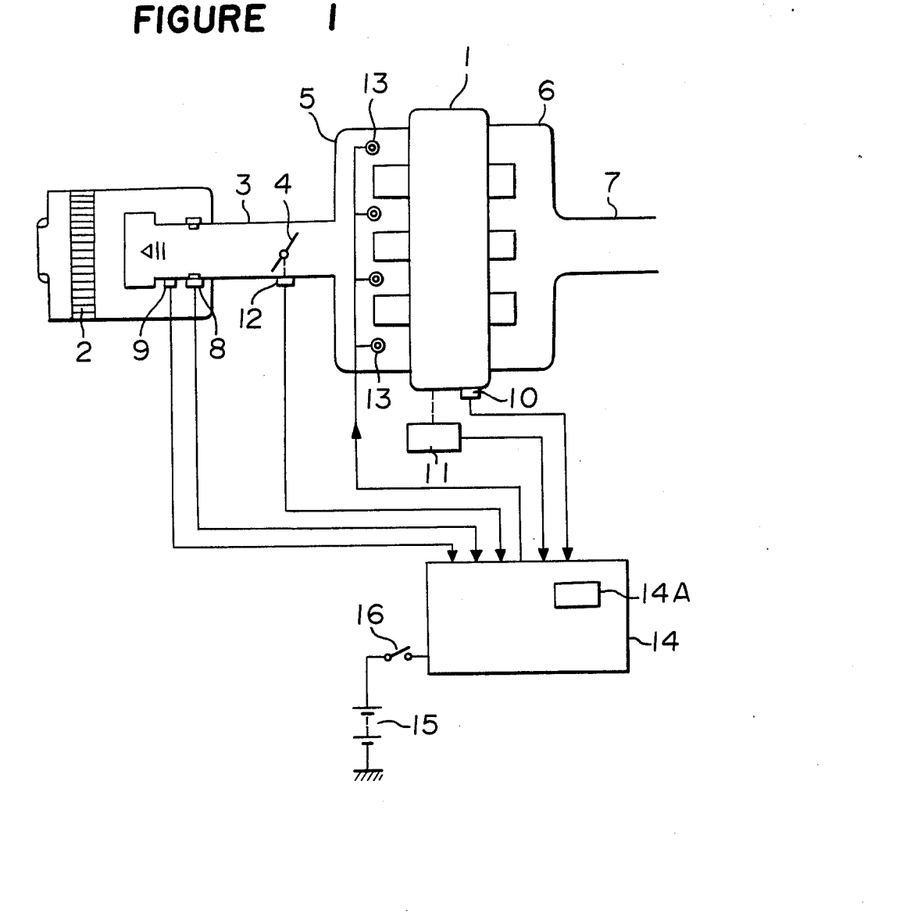
FIG. 1 is a diagram showing an engine provided with an embodiment of the fuel injection control apparatus according to the present invention.

Referring to the drawings, wherein the same reference numerals designate the same or corresponding parts throughout several views, and more particularly to FIG. 1 thereof, there is shown a diagram of the fuel injection control apparatus according to the present invention. In FIG. 1, a reference numeral 1 designates an engine mounted on an automobile for instance, a numeral 2 designates an air cleaner, a numeral 3 designates an intake air tube, and a numeral 4 designates a throttle valve.

Air is sucked into an intake air manifold 5 through the air cleaner 2, the intake air tube 3 and the throttle valve 4 to help combustion in the engine 1, and it is discharged to the atmosphere through an exhaust manifold 6 and a discharge tube 7.

An AFS 8 is provided in the intake air tube 3 to produce a pulse signal having a frequency in proportion to a flow rate A of intake air which is estimated to be sucked to the engine 1. An intake air temperature sensor 9 is attached onto the intake air tube 3 to detect the temperature AT of the intake air to generate a signal indicative of an analog quantity in proportion to the temperature of the intake air. A cooling water temperature sensor 10 is attached onto the engine housing to detect the temperature of cooling water WT for cooling the engine. An engine speed sensor 11 is to detect the number of revolution N of the crank shaft of the engine to generate a pulse signal having a frequency in response to the number of revolution N. An idling switch is also attached to the intake air tube 3 to detect as to whether the degree of opening of the throttle valve 4 is in a predetermined value or lower. Each electromagnetically operated fuel injector 13 is provided for each cylinder in the engine 1.

Figures 3, 4:
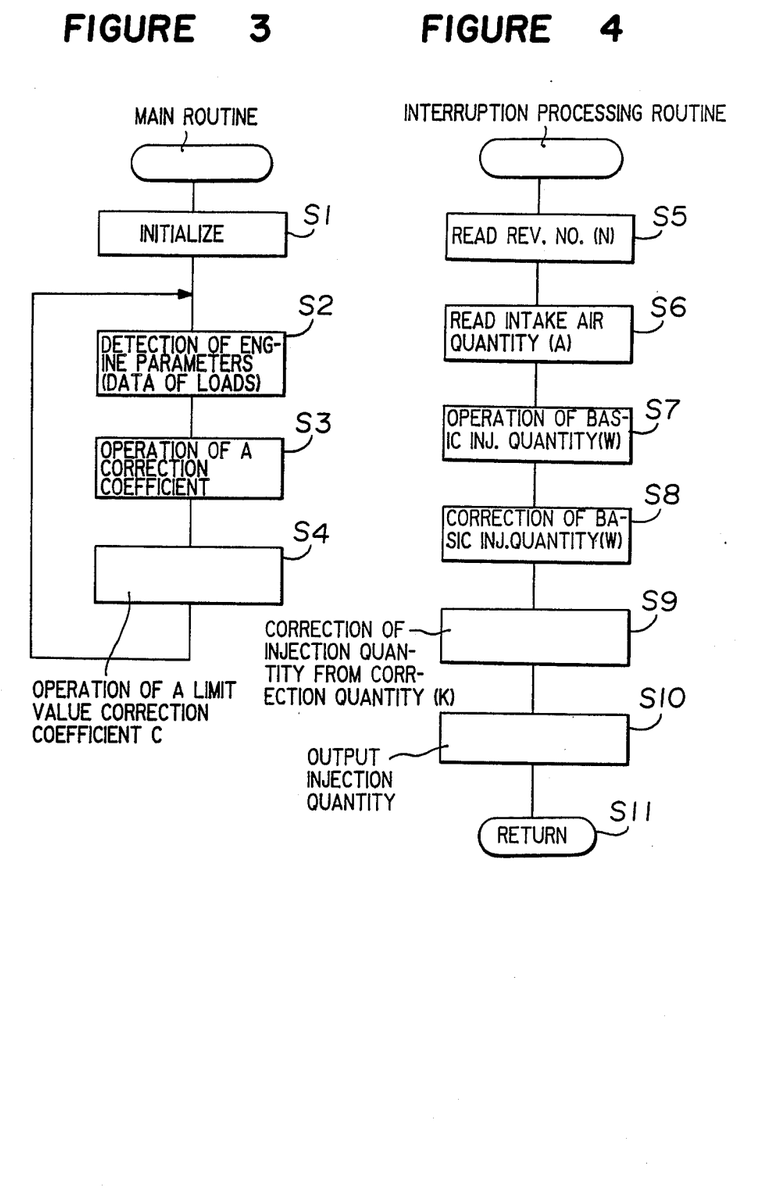
FIG. 3 is a flow chart of a main routine in accordance with an embodiment of the present invention.
FIG. 4 is a flow chart of an interruption processing routine with respect to the main routine.
Figure 5:
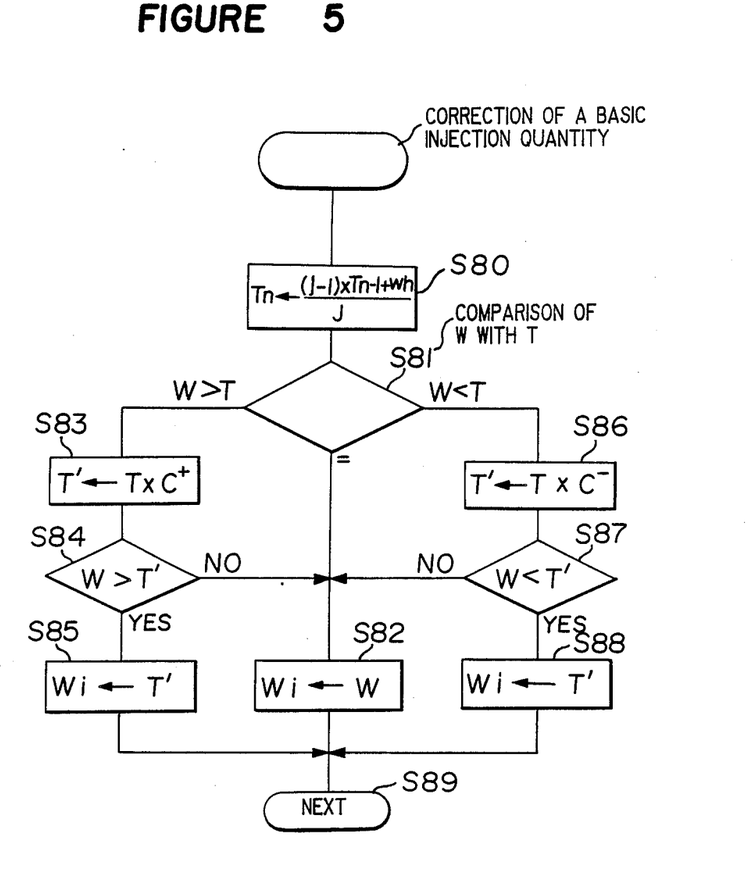
FIG. 5 is a flow chart showing an important part of the interruption processing routine.

A reference numeral 14 designates an electronic control device (ECU) provided with a read only memory (ROM which stores programs as shown by flow charts in FIGS. 3 to 5). The ECU 14 receives detection signals from the AFS 8, the intake air temperature sensor 9, the engine cooling water temperature sensor 10, the engine speed sensor 11 and the idling switch 12 to operate them so as to obtain a fuel injection quantity and so on. It also controls time of opening the electromagnetic fuel injector 13 to adjust the fuel injection quantity. A car battery 15 is connected to the ECU 14 through a key switch 16.

Figure 2:
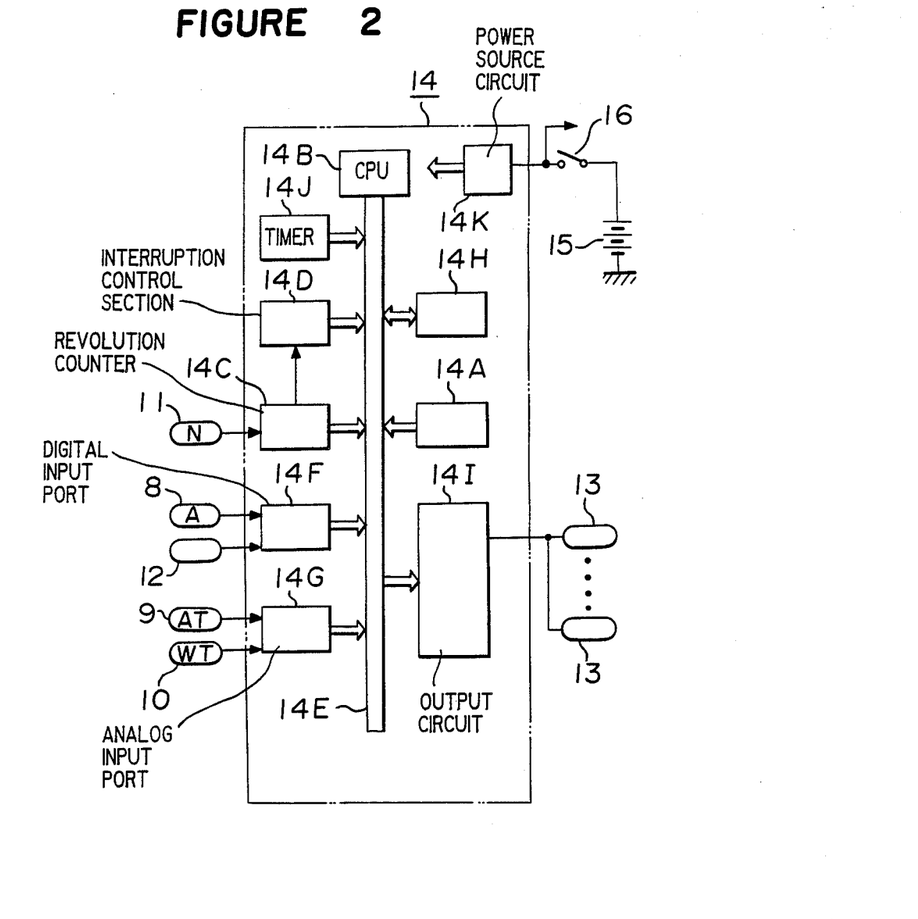
FIG. 2 is a block diagram showing in detail an embodiment of the electronically controlled fuel injection control apparatus shown in FIG. 1.

The detail of the structure of the ECU 14 will be described with reference to FIG. 2.

A numeral 14A designates the ROM described above, a numeral 14B designates a central processing unit (CPU) for operating the fuel injection quantity, a numeral 14C designates a counter to count the number of revolution N of the engine on the basis of a signal from the engine speed sensor 11. A numeral 14D designates an interruption control section which receives an instruction of interruption in synchronism with the revolution of the engine by the engine speed counter 14C and outputs an interruption signal to the CPU 14B through a bus line 14E. A numeral 14F designates a digital input port which counts the pulse signal from the AFS 8 and supplies an intake air quantity signal corresponding to the intake air quantity A to the CPU 14B. The digital input port 14F also receives a detection signal from the idling switch 12. A numeral 14G designates an analog input port constituted by, for instance, an analog multiplexer and an A/D converter, which A/D-converts the signals of the intake air temperature sensor 9 and the engine cooling water temperature sensor 10 to send the A/D-converted signals into the CPU 14B successively. A numeral 14H designates a random access memory (RAM) as a work memory for the CPU 14B. A numeral 14I designates an output circuit which converts the digital signal of fuel injection quantity operated by the CPU 14B into a pulse signal having a time width which determines an opening time for the electromagnetic fuel injector 13, so that the injectors are driven. A numeral 14J designates a timer for measuring passage of time and send the data to the CPU 14B. Each of the structural elements indicated by the numerals 14A, 14C-14D and 14F-14J are commonly connected to the CPU 14B through the bus line 14E. A numeral 14K designates a power source circuit which makes the voltage of the battery 15 constant so that a constant power source is provided for the electronic control unit 14. FIG. 3 is a diagram showing the main routine carried out by the CPU 14B; FIG. 4 is a diagram showing an interruption processing routine carried out by the CPU, and FIG. 5 is a flow chart showing processing of correction of a basic injection quantity W.

Figure 6:
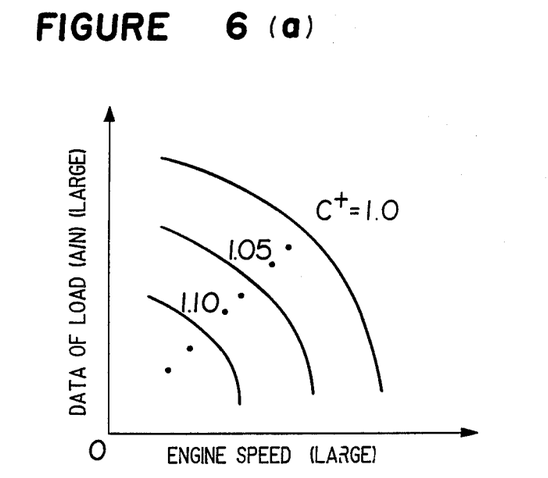
FIG. 6a and 6b are diagrams in a form of map concerning limit value correction coefficients in relation to engine speed and data of load used for the embodiment of the present invention.

The flow chart of FIG. 5 is the same as the conventional correction processing except that a limit value correction coefficient C is made variable. FIG. 6 shows a relation of limit value correction coefficients $C^+$, $C^-$ to data of load A/N (intake air quantity A/revolution speed N) as the ordinate and the revolution speed N as the abscissa. Such data are stored in the ROM 14A in a form of a map. In FIG. 6a, as the revolution speed N or the data of load A/N becomes large, the value of the limit value correction coefficient $C^+$ at the time of acceleration approaches a value of 1 from a value which is greater than 1. In FIG. 6b, as the revolution speed N or the data of load A/N becomes large, the value of the limit value correction coefficient $C^-$ at the time of deceleration approaches a value of 1 from a value smaller than 1. Thus, the limit value correction coefficients $C^+$, $C^{31}$ assume values in accordance with the values of the revolution speed N or the data of load A/N.

The operation of the above-mentioned embodiment of the present invention will be described.

When the key switch 16 is turned on so that the power source of the battery 15 is supplied to the power source circuit 14K, the operation for the main routine as shown in FIG. 3 is started.

After initialization at Step S1, parameters for the engine are read, and subsequently, a predetermined processing is conducted, and then, the resulted data are stored in the RAM 14H at step S2. In Step 2, specifically, the RAM 14H reads a digital value in response to the revolution speed N from the engine speed counter 14C, a digital value in response to the intake air quantity A from the digital input port 14F and a digital values in response to the intake air temperature AT and the cooling water temperature WT from the analog input port 14G. At Step S3, a fuel correction coefficient K is calculated on the basis of the intake air temperature AT and the cooling water temperature WT, and the resulted data are stored in the RAM 14H.

At Step S4, the data of load A/N (as a ratio of the intake air quantity A to the revolution speed N which is read at Step S2) is provided. According to the map of FIG. 6a, a limit value correction coefficient C ($C^+ \geqq 1$ at the side of acceleration, $C^{31} \leqq 1$ at the side of deceleration) is obtained through the ROM 14A in accordance with the data of load A/N and the revolution speed N. The resulted data are stored in the RAM 14H. When processing at Step S4 is completed, operation is returned to Step S2. In usual, the processing of the main routine of the Steps S2 through S4 in FIG. 6 is repeated in accordance with a control program.

When an interruption signal is received from the interruption control section 14D, processing of the main routine is interrupted even when this processing is going on, and the interruption processing routine shown in FIGS. 4 and 5 is taken.

At Step S5, a signal indicative of the number of revolution of the engine N, i.e. the revolution speed from the engine speed counter 14C is read. At Step S6, a signal indicative of the intake air quantity A from the digital input port 14F is read. At Step S7, a basic fuel injection quantity, i.e. an injection time W for the electromagnetic fuel injectors 13 which is determined by the revolution speed N, the intake air quantity A and a constant B previously determined and stored in the ROM 14A is obtained by calculation by using an operating formula W = P × A/N. At Step 8, a weighted average processing described below is conducted. Namely, the basic fuel injection quantity W is corrected in accordance with the flow chart shown in FIG. 5 by using the limit value correction coefficient C which is obtained at Step S4 in the main routine. At Step S9, the correction coefficient K for fuel injection which is obtained in the main routine is read from the RAM 14H to carry out calculation of correction for an injection quantity Wi so as to determine an air-fuel ratio. At Step S10, thus obtained data of fuel injection by the calculation of correction is set in the output circuit 14I. A pulse signal having a time width in response to this data is supplied to the electromagnetic fuel injectors 13 from the output circuit 14I. At Step S11, the interruption processing routine is returned to the main routine which is kept interrupted.

The detail of correction of the basic injection quantity at the above-mentioned Step S8 will be described with reference to FIG. 5.

At Step S80, the weighted average processing for the basic injection quantity W is carried out by using the operating formula as follows:

$$T_n = \frac{(J-1)T_{n-1} + W_n}{J}$$

where J is a constant as a coefficient of dulling treatment, T is a value for weighted average treatment, W is a basic injection quantity, and n is 0, 1, 2, ..., or n. When the dulling treatment coefficient J is relatively large, effect of the dulling treatment is large. However, when the dulling treatment coefficient J is relatively small, the effect of dulling is small.

At Step S81, comparison is made as to whether the basic injection quantity W is greater than or smaller than the weighted average value T.

When W>T at the time of acceleration, then, Step S83 is taken.

When W=T at the time of constant speed, then, Step S82 is taken.

When W<T at the time of deceleration, then, Step S86 is taken.

At Step S82, the value of the basic injection quantity W is replaced by a fuel injection pulse width Wi.

At Step S83, correction of the weighted average value T is made in such a manner that the limit value correction coefficient C+ obtained by Step S4 in the main routine is read from the RAM 14H and the weighted average value T is multiplied by the correction coefficient C+ to thereby obtain a limit value T'.

At Step S84, the basic injection quantity W is compared with the limit value T'. When W>T', operation goes to Step S85 where T' is replaced by Wi. On the other hand, when W≦T', operation goes to Step S82 where W is replaced by Wi.

At Step S81, when W<T, operation goes to Step S86 where correction of T is made in such a manner that the limit value correction coefficient C− obtained at Step S4 in the main routine is read from the RAM 14H and T is multiplied by the correction coefficient C− to thereby obtain a limit value T'.

At Step S87, W is compared with T'. When W<T', operation goes to Step S88 where T' is replaced by Wi. On the other hand, when W≧T', operation goes to Step S82 where W replaced by Wi. Thus, the treatment of correction of the basic injection quantity W is carried out.

Figure 7A:
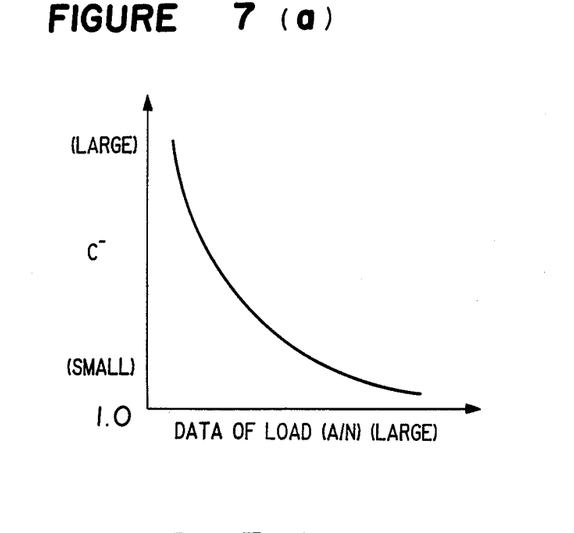
FIGS. 7a and 7b are diagrams in a form of map in which limit value correction coefficients are plotted in relation to data of load for another embodiment of the present invention.
Figure 7B:
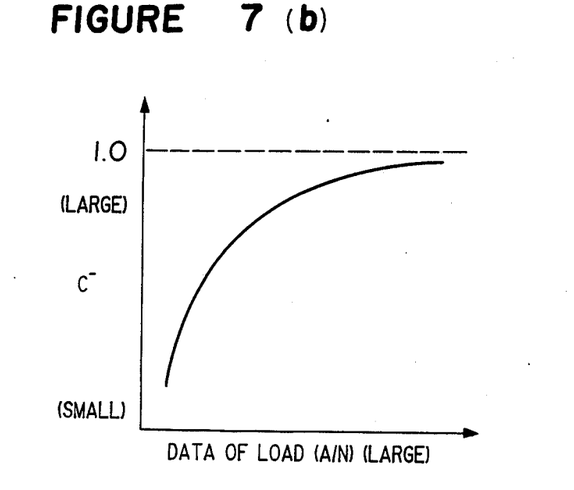

FIG. 7 is a diagram of maps according to another embodiment of the present invention. In FIG. 7a, the abscissa represents data of load and the ordinate represents a limit value correction coefficient C+ at the time of acceleration. In FIG. 7b, the abscissa represents data of load and the ordinate represents a limit value correction coefficient C− at the time of deceleration. The maps as in FIG. 7 is stored in the ROM 14A. This embodiment is the same as the first embodiment except that the limit value correction coefficients C+, C− are obtained in accordance with FIG. 7 by using only the data of load A/N obtained at Step S4 in FIG. 3.

In the above-mentioned embodiments, A/N is used as the data of load as shown in FIGS. 6 and 7. However, an output signal from a pressure sensor which detects an intake pressure at the downstream of the throttle valve 4 may be used. In this case, it is possible to carry out operation for the basic injection quantity W on the basis of the load data.

As described above, in accordance with the present invention, the limitation of the fuel injection pulse width in response to a dulling treatment modified by a limit value correction coefficient which is depending on a condition of load to the engine, is determined. Accordingly, there is obtainable the optimum air-fuel ratio so as to follow the condition of acceleration or deceleration of an automobile, whereby an excellent fuel consumption efficiency can be obtained.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel injection control apparatus which comprises:
   a load detecting means to detect a load to an engine to thereby generate a signal;
   a basic injection quantity operating means to operate said signal so as to obtain the pulse width of a basic fuel-injection time for a fuel injector in response to the condition of load,
   means for a calculating an average weighted value of said pulse width,
   first limiting means for comparing said average weighted value with said pulse width and for adjusting said average weighted value by a limit value correction coefficient if said average weighted value does not equal said pulse width, said limit value correction coefficient being determined only by engine revolutions and load,
   a second limiting means for comparing said pulse width with said adjusted average weighted value and for assigning a second pulse width for an actual fuel-injection time based on this comparison;
   wherein the basic fuel-injection time, rather than the average weighted value, is used during idling.

2. The fuel injection control apparatus according to claim 1, wherein said load detecting means includes a rotation speed detecting means to detect the number of rotation of said engine, said limit value correction coefficient being determined in accordance with said revolution speed of engine and said condition of load.

3. The fuel injection control apparatus according to claim 1, wherein said second pulse width is equal to said first pulse width when the average weighted value equals the pulse width, when the pulse width is greater than the average weighted value and not greater than the adjusted average weighted value, or when the pulse width is less than the average weighted value and not less than the adjusted average weighted value; and wherein said second pulse width is equal to the adjusted average weighted value when the pulse width is greater than the average weighted value and also greater than the adjusted average weighted value or when the pulse width is less than the average weighted value and also less than the adjusted average weighted value.

* * * * *